United States Patent [19]
Kettenis

[11] Patent Number: 5,734,434
[45] Date of Patent: Mar. 31, 1998

[54] NON-LINEAR ASPECT RATIO ADAPTATION

[75] Inventor: Jeroen M. Kettenis, Eindhoven, Netherlands

[73] Assignee: U.S. Philips Corporation, New York, N.Y.

[21] Appl. No.: 640,649

[22] Filed: May 1, 1996

[30] Foreign Application Priority Data

May 10, 1995 [EP] European Pat. Off. ............ 95201202

[51] Int. Cl.$^6$ ............... H04N 7/01; H04N 5/46; H04N 11/20
[52] U.S. Cl. ............ 348/445; 348/555; 348/556; 348/558; 348/913; 348/580; 348/581
[58] Field of Search ............... 348/55, 556, 557, 348/558, 568, 561, 445, 913, 578, 580, 581; H04N 7/01, 5/46, 11/20

[56] References Cited

U.S. PATENT DOCUMENTS

| | | | |
|---|---|---|---|
| 4,605,952 | 8/1986 | Powers | 358/13 |
| 4,654,696 | 3/1987 | Dayton et al. | 348/474 |
| 4,760,455 | 7/1988 | Nayashima | 348/556 |
| 5,218,436 | 6/1993 | Sugiyama et al. | 348/469 |
| 5,229,853 | 7/1993 | Myers | 348/445 |
| 5,349,548 | 9/1994 | Nillesen | 364/724 |

FOREIGN PATENT DOCUMENTS

| | | |
|---|---|---|
| 0416619A2 | 3/1991 | European Pat. Off. |
| 2191060 | 12/1987 | United Kingdom |
| WO9403999 | 2/1994 | WIPO |

*Primary Examiner*—John K. Peng
*Assistant Examiner*—Vivek Srivastava
*Attorney, Agent, or Firm*—Edward W. Goodman

[57] ABSTRACT

An adaptation of an aspect ratio of a picture signal is effected by providing (1) a second derivative (D2) of an expansion factor (EF) in response to at least one constant value (C1, C2), by providing (3-13) a first derivative (D1) of the expansion factor (EF) in response to the second derivative (D2), by providing (14-21) the expansion factor (EF) in response to the first derivative (D1), and by expanding the picture signal in dependence upon the expansion factor (EF) to adapt the aspect ratio of the picture signal, whereby use of an expansion factor (EF) less than one results in a compression of said picture signal.

6 Claims, 3 Drawing Sheets

NON-LINEAR ASPECT RATIO ADAPTATION

BACKGROUND OF THE INVENTION

1. Field of the Invention

The invention relates to a non-linear aspect ratio adaptation between, for example, 16:9 and 4:3 aspect ratios of picture signals.

2. Description of the Related Art

WO-A-94/03999 discloses a method of showing 16:9 pictures on 4:3 displays, in which each line of the television signal is compressed and/or expanded so that the ratio of the length of a segment of an unprocessed signal to the length of the resultant signal derived from it, varies along the line. Preferably, each line is subject to "cylindrical" processing such that it is compressed as though the line were extended along the arc of a circle and projected along a direction onto a flat plane joining the ends of an arc. Receivers with 16:9 displays would require circuitry to undo the cylindrical processing. The publication does not show any circuitry to carry out the cylindrical compression and/or expansion.

SUMMARY OF THE INVENTION

It is, inter alia, an object of the invention to provide a practical method and circuit for carrying out a non-linear aspect ratio adaptation. To this end, a first aspect of the invention provides an aspect ratio adaptation method comprising the steps of providing a second derivative of an expansion factor in response to at least one constant value; providing a first derivative of said expansion factor in response to said second derivative of said expansion factor; providing said expansion factor in response to said first derivative of said expansion factor; and expanding said picture signal in dependence upon said expansion factor to adapt said aspect ratio of said picture signal, whereby use of an expansion factor less than one results in a compression of said picture signal. A second aspect of the invention provides an aspect ratio adaption circuit comprising means coupled to receive at least one constant value for providing a second derivative of a compression factor; first integration means coupled to receive said second derivative of said compression factor, to provide a first derivative of said compression factor; second integration means coupled to receive said first derivative of said compression factor, to provide said compression factor; and means for compressing said picture signal in dependence upon said compression factor to adapt said aspect ratio of said picture signal, whereby use of a compression factor less than one results in an expansion of said picture signal. A third aspect of the invention, provides a television signal receiver comprising such an aspect ratio adaptation circuit. A fourth aspect of the invention, provides a method of generating a compatible television signal having a standard aspect ratio on the basis of an input picture signal having a wider-than-standard aspect ratio.

In accordance with the invention, an adaptation of an aspect ratio of a picture signal is effected by providing a second derivative of an expansion or compression factor in response to at least one constant value, by providing a first derivative of the expansion or compression factor in response to the second derivative, by providing the expansion or compression factor in response to the first derivative, and by expanding (compressing) the picture signal in dependence upon the expansion (compression) factor to adapt the aspect ratio of the picture signal, whereby use of an expansion factor less than one results in a compression of the picture signal, or whereby use of a compression factor less than one results in an expansion of the picture signal.

These and other aspects of the invention will be apparent from and elucidated with reference to the embodiments described hereinafter.

DESCRIPTION OF THE PREFERRED EMBODIMENTS

Figure 1:
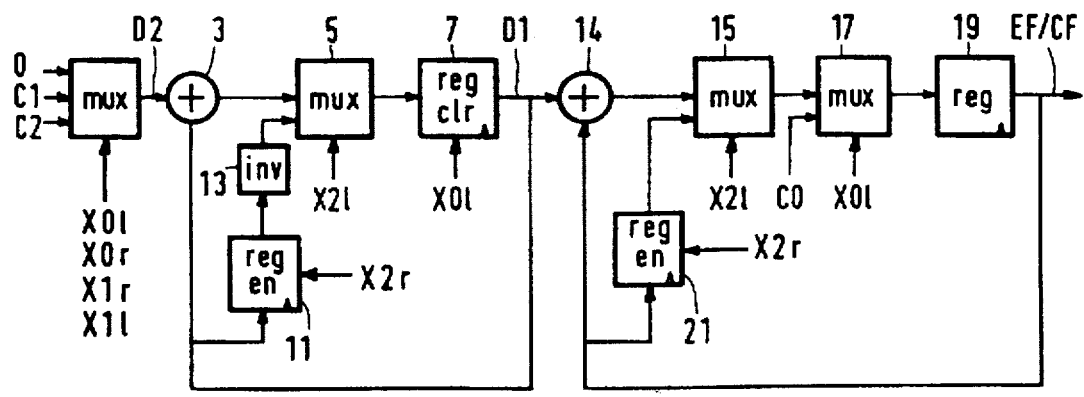
FIG. 1 shows an embodiment of a circuit for obtaining an expansion factor.
Figure 2A:
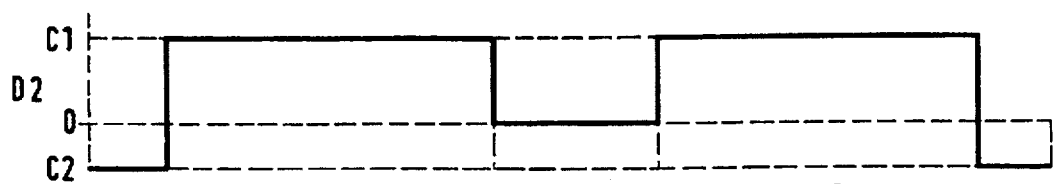
FIGS. 2a–af show various graphs illustrating the operation of the embodiment of FIG. 1.

In the expansion factor generating circuit 33 shown in FIG. 1, three constant values 0, (zero), C1, C2 are applied to a multiplexer 1, which is switched at instants X0l, X0r, X1r and X1l to supply a signal D2 selected from the input constant values, see FIG. 2a. This signal D2 is twice integrated (by integrators 3–13 and 14–21) to obtain the expansion factor EF by which the picture signal is to be expanded (or compressed, when the expansion factor EF is less than one); consequently, D2 is the second derivative of the expansion factor EF. The expansion factor EF indicates the ratio between the input sample rate and the output sample rate.

In the first integrator 3–13, the second derivative D2 is applied to a first input of an adder 3 whose output is connected to a first input of a multiplexer 5. The multiplexer 5 is controlled by a timing signal X2l, indicated at the left-hand side of FIG. 2c. An output of the multiplexer 5 is applied to the second input of the adder 3 thru a register 7. The register 7 is cleared by a clear signal given at instant X0l, indicated in FIG. 2c. An output of the register 7 is also applied to a second input of the multiplexer 5 thru a register 11 and an inverter 13. The register 11 is enabled at instant X2r, indicated at the right-hand side of FIG. 2c. The output of the register 7 supplies a signal D1, shown in FIG. 2b, which constitutes the first derivative of the expansion factor EF.

In the second integrator 14–21, the first derivative D1 is applied to a first input of an adder 14 whose output is connected to a first input of a multiplexer 15. The multiplexer 15 is also controlled by the timing signal X2l. An output of the multiplexer 15 is applied to a first input of a multiplexer 17, whose second input receives a constant negative value C0 shown in FIG. 2c. The multiplexer 17 is controlled by the timing signal X0l. An output of the multiplexer 17 is applied to the second input of the adder 14 thru a register 19. An output of the register 19 is also applied to a second input of the multiplexer 15 thru a register 21. The register 21 is also enabled at instant X2r. The output of the register 19 supplies the expansion factor EF, shown in FIG. 2c.

Figure 2B:
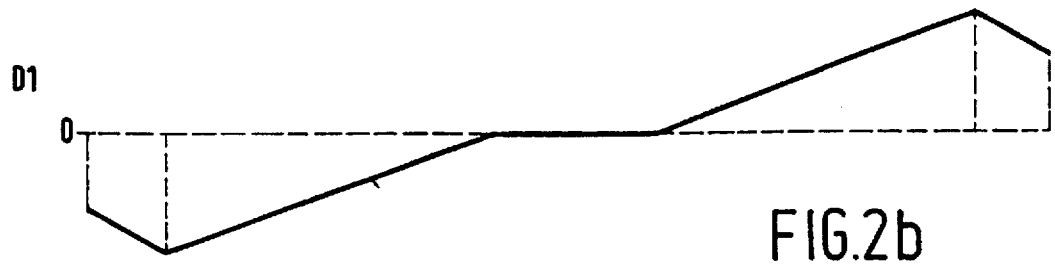
Figure 2C:
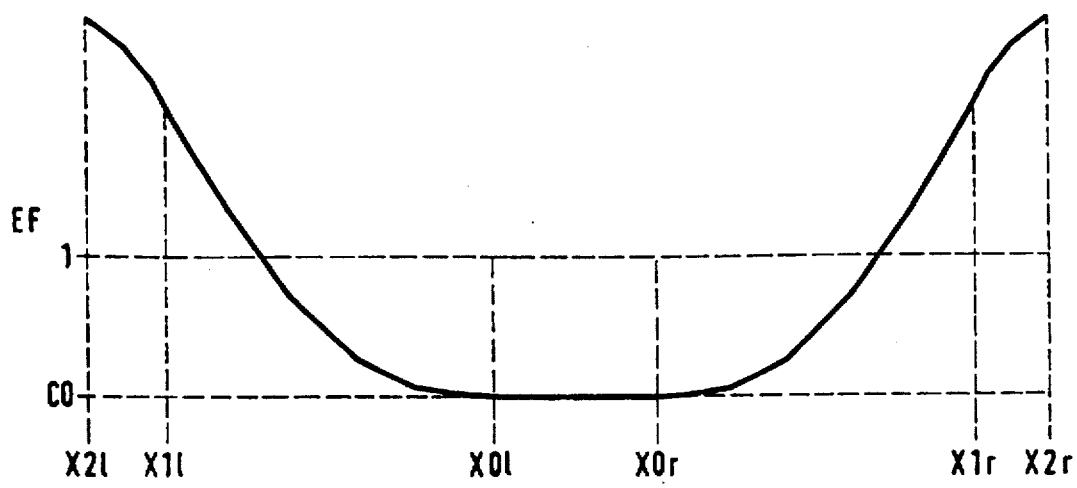

The curve of FIG. 2c gives the dynamic change of the expansion factor EF over the line period. The expansion factor EF is effectively a sample rate conversion factor. The expansion factor EF is obtained by using second order integration of preset values, which results in a parabolically shaped output. By changing within the line to the second order integration of another constant value, it is possible to enter another parabola, without discontinuity in the first and zeroth order. Therefore, a variety of curves can be produced with parabolically shaped regions. The switching between the above-mentioned regions can be effected on certain pixel positions in the line. These pixel positions may be fixed or programmable.

In general, it is desirable that the expansion factor in the center of the picture is directly programmable. The expansion factor at the sides of the line is then a result of the integration process.

The constant values C1 and C2 are selected by the user to influence the rate of change of the expansion/compression. In particular, if a very smooth change in the expansion/compression is desired over the full width of the image, low absolute values of C1 and C2 are chosen. Conversely, if it is desired that only the margins are affected, high absolute values of C1 and C2 are chosen.

FIGS. 2a–2c show the building of an expansion factor curve with 5 regions. The $X_i l$ positions give the transitions between the regions in the left-hand half of the line, while the $X_i r$ positions give the transitions between the regions in the right-hand half of the line. For a symmetrical curve, for all i the following equation holds:

$$X_i l = \text{active line length} - X_i r.$$

A proper solution to initialize the expansion factor curve is to start processing at the X01 position. The expansion factor EF is then forced to the preset value C0. Also, the first and second derivatives D1, D2 must be forced to zero. The first derivative D1 is forced to zero by clearing the register 7 at instant X01. The second derivative D2 is made zero by selecting the upper input of multiplexer 1. By switching to other values of the second derivative D2 at instants X0r and X1r, the right-hand half of the EF curve is built. Between the instants X0r and X1r, the curve of FIG. 2e results from the double integration of the constant positive value C1. Between the instants X1r and X2r, a double integration of the constant negative value C2 is added to the integration result at the instant X1r. At the beginning of the following line, i.e., at instant X2r (end) corresponding to instant X2l (beginning), the values of the expansion factor EF and the first derivative D1 should be copied from the previous line, whereby the first derivative D1 should be inverted. This inversion of the first derivative D1 is effected by switching the multiplexer 5 once to the output of the inverter 13 at the beginning X2l of each line, while the inverter 13 receives the last value of the first derivative D1 at the end X2r of the preceding line from the register 11. The flawless take-over of the expansion factor EF itself is effected because at the beginning X2l of each line, the multiplexer 15 is switched once to the output of the register 21 to receive the last value of the expansion factor EF at the end X2r of the preceding line. From the instant X2l, the left-hand half of the curve of FIG. 2c is built. Between the instants X2l and X1l, the constant negative value C2 is integrated and added to the already negative value of the first derivative D1 at the instant X2l, while the negative value of the first derivative D1 is integrated and added to the value of the expansion factor EF at the instant X2l, which results in a decrease of the expansion factor EF. Between the instants X1l and X0l, the positive value of the constant C1 is integrated and added to the value of the first derivative D1 at the instant X1l, so that the first derivative D1 increases from its negative value to zero. As the first derivative D1 is negative, its integration still results in a decrease of the expansion factor EF.

Figure 2D:
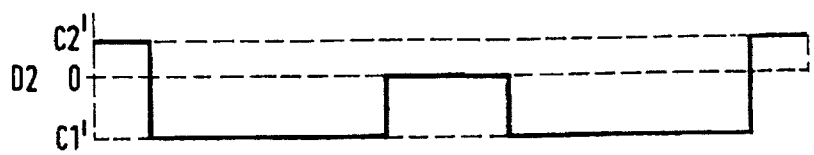
Figure 2E:
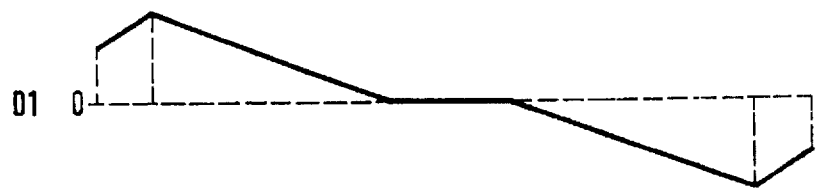
Figure 2F:
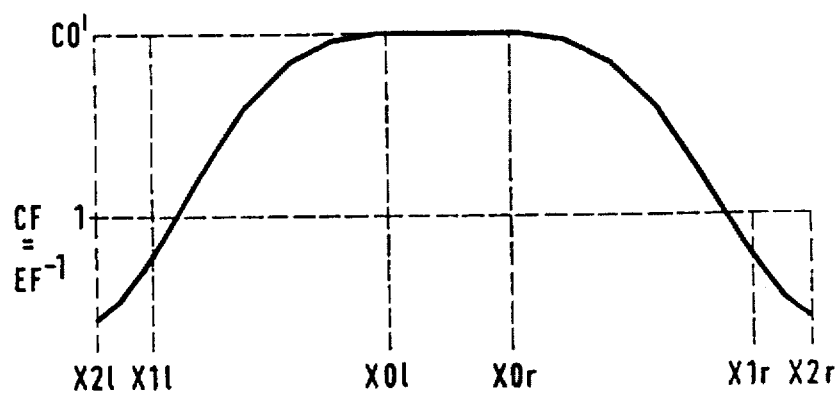

FIGS. 2d–2f correspond to FIGS. 2a–2c, but show the derivation of a compression factor $CF=EF^{-1}$ which is the inverse of a corresponding expansion factor EF. The constant value C0' is greater than one, while the constant values C1' and C2' have respective signs opposite to those of the above-mentioned constant values C1 and C2, respectively. It thus appears that in the present invention, the notions compression and expansion are fully interchangeable, and that the invention is not limited to only one of these notions. It also appears that the embodiment of FIG. 1 is fury capable of generating a compression factor CF instead of an expansion factor EF.

Figure 3:
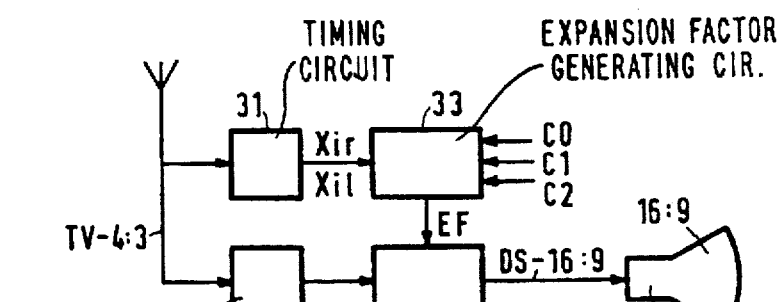
FIG. 3 shows a television receiver according to the invention which comprises the circuit of FIG. 1.

FIG. 3 shows a television receiver comprising the circuit of FIG. 1. The television receiver comprises a timing circuit 31 for supplying the instants $X_i r$ and $X_i l$ discussed above to the expansion factor generating circuit 33 of FIG. 1, in response to a received television signal TV-4:3 having a standard aspect ratio 4:3. The television receiver also comprises a processing circuit 35 coupled to receive the television signal TV-4:3 for carrying out all usual processing operations to provide a processed television signal. The processed television signal is applied to an aspect ratio adapting circuit 37 which provides a display signal DS-16:9 having an adapted aspect ratio 16:9 to a display device 39 for generating a display of said television signal TV-4:3 at said adapted aspect ratio 16:9.

The aspect ratio adapting circuit 37 may include an interpolation circuit to effect a sample rate conversion in dependence upon the expansion factor EF. Two ways of sample rate conversion can be taken into account: clock modulation, and sample rate conversion by interpolation techniques.

Figure 4:
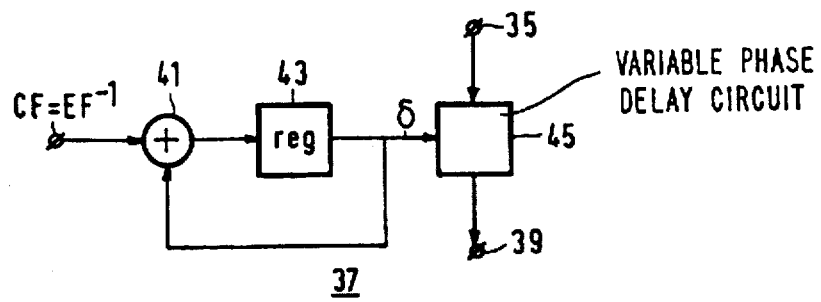
FIG. 4 shows a preferred embodiment of an aspect ratio adapting circuit according to the invention.

FIG. 4 shows a preferred embodiment of an aspect ratio adapting circuit 37. A compression factor CF (FIG. 2f)=$EF^{-1}$ is applied to a first input of an adder, whose output is connected to its second input thru a register 43. The combination of adder 41 and register 43 is commonly called a discrete time oscillator (DTO). The output of the register 43 furnishes a desired delay δ, i.e., the interpolation position of an output pixel with regard to the positions of the input samples. It is strongly preferred that the delay δ has a subpixel-accuracy. The delay δ is applied to a variable phase delay circuit 45 which receives the processed television signal from the processing circuit 35 and which furnishes the display signal to the display device 39. Variable phase delay circuits are known as such from U.S. Pat. No. 5,349,548 (PHN 14,108) and the non-prepublished EP patent application no. 94,203,622.9, corresponding to U.S. patent application Ser. No. 08/340,570, filed Nov. 16, 1994; (PHN 14,676), together with any corresponding patents and patent applications which are incorporated by reference herein. In a preferred embodiment, the variable phase delay circuit uses a delay line with 4 taps for chrominance and 10 taps for luminance.

Figure 5A:
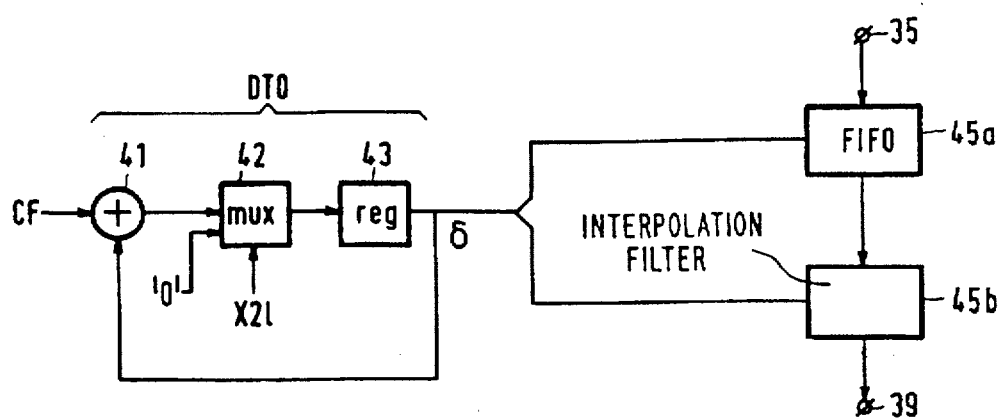
FIGS. 5a and 5b show two alternative elaborations of the embodiment of FIG. 4.
Figure 5B:
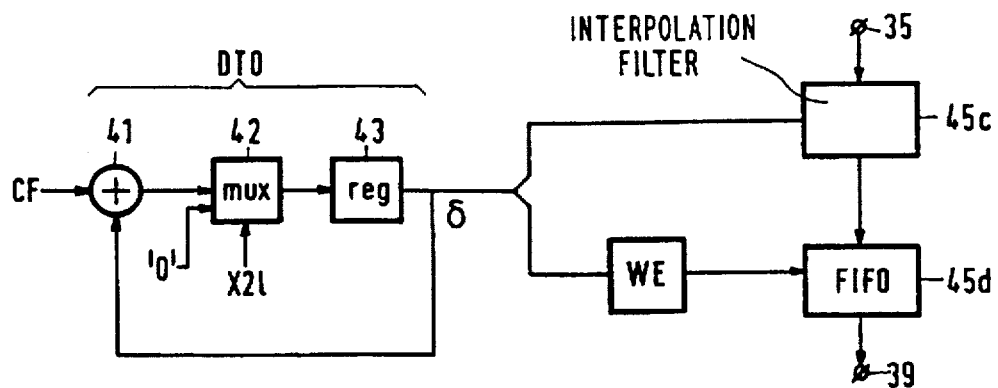

FIGS. 5a and 5b show two more detailed alternative elaborations of the embodiment of FIG. 4. At the beginning of each line, the DTO is reset by switching a multiplexer 42, which is coupled between the adder 41 and the register 43, in such a manner that a zero value is applied to the register 43 at instant X2l. The operation of a DTO on the compression factor data CF is easiest explained for a configuration as shown in FIG. 5a with a FIFO memory 45a in front of an interpolation filter 45b. A preferred interpolation filter is formed by a variable phase delay filter. The DTO simply integrates the compression factor CF along the video line to obtain a subpixel-accurate interpolation position δ for each output pixel. The subpixel part of this position δ is applied to the interpolation filter 45b, whereas the integer part is directly (as an address) or indirectly (via enabling or disabling a read enable signal on the memory 45a) used for addressing the FIFO 45a. The DTO performs the operation in accordance with the following equation:

$$position(X) = \Sigma_{x21}{}^X (CF(X)).$$

In case of indirect addressing via a read enable signal RE:

RE=1 if [address(X)=address(X-1)+1], else RE=0.

To facilitate the handling of compression factors CF greater than one, and to allow a stream of samples to the interpolation filter 45b to be fast enough to produce a correctly positioned output sample in each clock cycle, additionally the measure can be taken to access, for example, two pixels in the FIFO 45a per clock cycle. This generate the write enable signal WE, the following algorithm can be applied:

WE=1 if [address (X)=address(X-1)+1], else

WE=0, but then WE becomes 1 again in the next clock cycle.

To facilitate the handling of compression factors CF less than one, and to allow a stream of samples from the interpolation filter 45c to be fast enough to keep track with the stream of input samples, additionally the measure can be taken to produce, for example, two pixels to the FIFO 45d per clock cycle. This doubles the effective data rate, and thus enables compression factors CF having values down to ½. This can also be obtained by doubling the clock frequency of the interpolation filter 45c.

In the table below, an example is given for the interpolation process with a constant CF(X) of 1.44. The row clck indicates the clock-cycle, the row 45d indicates the FIFO memory write address, the row 45c indicates the filter interpolation position, and the row WE indicates the write enable signal WE.

| clck | 0 | 1 | 2 | 3 | 4 | 5 | 6 | 7 | 8 | 9 |
|------|---|---|---|---|---|---|---|---|---|---|
| X-X21 | 0 | 1 | 2 | 3 | 4 | 5 | 6 | 7 | 8 | 9 |
| CF | 1.44 | 1.44 | 1.44 | 1.44 | 1.44 | 1.44 | 1.44 | 1.44 | 1.44 | 1.44 |
| δ | 0 | 1.44 | 2.88 | — | 4.32 | 5.76 | — | 7.2 | 8.64 | — |
| 45d | 0 | 1 | 2 | — | 3 | 4 | — | 5 | 6 | — |
| 45c | 0 | 0.44 | 0.88 | — | 0.32 | 0.76 | — | 0.2 | 0.64 | — |
| WE | 1 | 1 | 1 | 0 | 1 | 1 | 0 | 1 | 1 | 0 | doubles the effective data rate, and thus enables compression factors CF having values up to 2.

If, for example, the compression factor CF is (constantly) 0.72, the position values will behave as in the following table, in which CF is the compression factor at position X, the row δ indicates the subpixel-accurate interpolation position, the row 45a indicates the memory read address of the FIFO 45a, the row 45b indicates the subpixel part handled by the interpolation filter 45b, and the row RE indicates the read enable signal RE.

Figure 6:
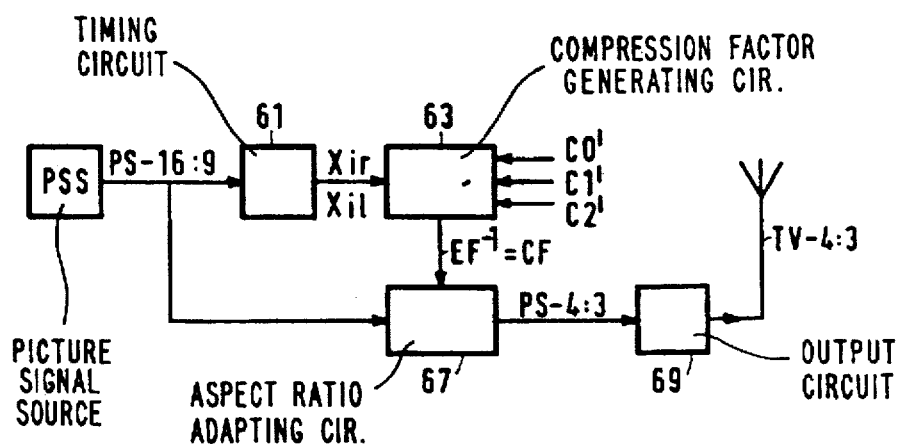
FIG. 6 illustrates a method of generating a compatible television signal having a standard aspect ratio on the basis of an input picture signal having a wider-than-standard aspect ratio.

The curve of FIG. 2c is suitable for television signal receivers; if such a curve is to be used in television encoders to squeeze a 16:9 aspect ratio signal into a 4:3 format, the curve should be upside down as shown in FIG. 2f which can easily be obtained if a negative value C1' is chosen instead of C1 and a value C0' greater than one is chosen instead of C0. FIG. 6 illustrates a method of generating a compatible television signal TV-4:3 having a standard aspect ratio 4:3 on the basis of an input picture signal PS-16:9 having a wider-than-standard aspect ratio (16:9). A picture signal source PSS produces the input picture signal PS-16:9 having a wider-than-standard aspect ratio 16:9. A timing circuit 61

| X-X21 | 0 | 1 | 2 | 3 | 4 | 5 | 6 | 7 | 8 | 9 |
|-------|---|---|---|---|---|---|---|---|---|---|
| CF | 0.72 | 0.72 | 0.72 | 0.72 | 0.72 | 0.72 | 0.72 | 0.72 | 0.72 | 0.72 |
| δ | 0 | 0.72 | 1.44 | 2.16 | 2.88 | 3.6 | 4.32 | 5.04 | 5.76 | 6.48 |
| 45a | 0 | 0 | 1 | 2 | 2 | 3 | 4 | 5 | 5 | 6 |
| 45b | 0 | 0.72 | 0.44 | 0.16 | 0.88 | 0.6 | 0.32 | 0.04 | 0.76 | 0.48 |
| RE |   | 0 | 1 | 1 | 0 | 1 | 1 | 1 | 0 | 1 |

The above is simplified in the sense that, actually, for the interpolation filter 45b both a number of samples to the left of the interpolation position δ and a number of samples to the right of the interpolation position δ are required at the instance that the interpolation is done. An experienced designer will note this and apply appropriate pipelining measures.

Another alternative is to have a configuration with an interpolation filter 45c followed by a FIFO memory 45d, as illustrated in FIG. 5b. In that case, the input data-stream to the interpolation filter 45c is constant, but not in each clock cycle an interpolated sample is provided by the interpolation filter 45c. In such a case, a write enable signal WE is used for controlling writing into the FIFO 45d. The write enable signal WE is active in each clock cycle where the interpolation filter 45c can produce the next sample in line. To supplies the instants $X_i r$ and $X_i l$ discussed above to an compression factor generating circuit 63 similar to that of FIG. 1, in response to the input picture signal PS-16:9. The compression factor generating circuit 63 receives a constant value C0' greater than one, and constant values C1' and C2' having respective signs opposite to those of the above-mentioned constant values C1 and C2, respectively. The compression factor generating circuit 63 supplies a compression signal CF=EF$^{-1}$ whose value is one over that of the above-mentioned expansion factor EF. The input picture signal PS-16:9 is applied to an aspect ratio adapting circuit 67 similar to the circuit 37 shown in FIG. 4. The aspect ratio adapting circuit 67 provides a picture signal PS-4:3 having a standard aspect ratio 4:3 in dependence upon the compression factor CF. An output circuit 69 furnishes a compatible television signal TV-4:3 having the standard aspect ratio 4:3 on the basis of the picture signal PS-4:3.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer. It is obvious that the number of regions can be freely adapted; in an extreme situation, only a one fixed value C1 is used for the second derivative, in which case a mere parabola results for the expansion or compression factor curve. The instants X0l and X0r may coincide. In FIG. 1, the multiplexer 17 can be omitted if the register 19 is cleared at instant X0l and the constant value C0 is added to the output of the so adapted circuit of FIG. 1 to obtain the desired minimum value of the parabola-like curve. As mentioned hereinbefore, the notions compression and expansion are fully interchangeable, and the invention is not limited to only one of these notions.

As mentioned above, clock modulation can be used as an alternative to interpolation techniques for the required sample rate conversion. A clock modulation solution can be achieved by means of a FIFO memory and separate write and read clocks. In that case, a similar dynamic compression/expansion function can be obtained when the compression factor CF is applied to a voltage controlled oscillator VCO which directly determines the read clock of the FIFO memory. In that case, the write clock of the FIFO memory is controlled by a line locked clock generator. Alternatively, the expansion factor EF can be applied to a voltage controlled oscillator VCO for determining the write clock of the FIFO memory, when its read clock is controlled by a line locked clock generator.

I claim:

1. A method of adapting an aspect ratio of a picture signal, comprising the steps:

providing a second derivative of an expansion factor in response to at least one constant value;

providing a first derivative of said expansion factor in response to said second derivative of said expansion factor;

providing said expansion factor in response to said first derivative of said expansion factor; and expanding said picture signal in dependence upon said expansion factor to adapt said aspect ratio of said picture signal, whereby use of an expansion factor less than one results in a compression of said picture signal.

2. A method as claimed in claim 1, wherein the step of providing said first derivative comprises inverting said first derivative at the end of each line of the picture signal.

3. A method as claimed in claim 1, wherein said providing steps are initialized at an instant corresponding to an extreme value of said expansion factor.

4. A circuit for adapting an aspect ratio of a picture signal, comprising:

means coupled to receive at least one constant value for providing a second derivative of a compression factor;

first integration means coupled to receive said second derivative of said compression factor, to provide a first derivative of said compression factor;

second integration means coupled to receive said first derivative of said compression factor, to provide said compression factor; and means for compressing said picture signal in dependence upon said compression factor to adapt said aspect ratio of said picture signal, whereby use of a compression factor less than one results in an expansion of said picture signal.

5. A television signal receiver comprising:

processing means coupled to receive a television signal for providing a processed television signal;

an aspect ratio adapting circuit comprising:

means coupled to receive at least one constant value for providing a second derivative of a compression factor;

first integration means coupled to receive said second derivative of said compression factor, to provide a first derivative of said compression factor;

second integration means coupled to receive said first derivative of said compression factor, to provide said compression factor; and means for compressing said picture signal in dependence upon said compression factor to adapt said aspect ratio of said picture signal, whereby use of a compression factor less than one results in an expansion of said picture signal, said aspect ratio adapting circuit being coupled to receive the processed television signal for providing a display signal having an adapted aspect ratio; and a display device coupled to receive the display signal for generating a display of said television signal at said adapted aspect ratio.

6. A method of generating a compatible television signal having a standard aspect ratio on the basis of an input picture signal having a wider-than-standard aspect ratio, comprising the steps of:

producing said input picture signal having a wider-than-standard aspect ratio;

adapting the aspect ratio of said input picture signal comprising the steps:

providing a second derivative of an expansion factor in response to at least one constant value;

providing a first derivative of said expansion factor in response to said second derivative of said expansion factor;

providing said expansion factor in response to said first derivative of said expansion factor; and expanding said picture signal in dependence upon said expansion factor to adapt said aspect ratio of said picture signal, whereby use of an expansion factor less than one results in a compression of said picture signal, to obtain a picture signal having said standard aspect ratio;

furnishing said compatible television signal on the basis of said picture signal having said standard aspect ratio.

* * * * *